June 24, 1930.  I. E. HAFLER  1,766,818

TRANSPLANTER

Filed May 5, 1928

Inventor

Ida E. Hafler

Patented June 24, 1930

1,766,818

UNITED STATES PATENT OFFICE

IDA EISENHART HAFLER, OF BINGEN, PENNSYLVANIA

TRANSPLANTER

Application filed May 5, 1928. Serial No. 275,480.

The present invention contemplates an article whereby pot grown plants may be transferred without disturbing the roots or soil.

The invention provides a device which may be stored and shipped in flat and compact form, thereby economizing space and facilitating handling.

The device includes a member and arms pivoted thereto, two such members being placed one upon the other and pivoted at a central point to admit of one of the members turning relatively to the other member.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which—

Corresponding and like parts are referred to in the following description and designated in the several views of the drawing by like reference characters.

The device contemplates similar parts which are placed one upon the other to occupy a registering position, as indicated by the full lines in Figure 4 of the accompanying drawing, whereby the devices may be stored and shipped in piles, so as to occupy the smallest space possible.

Figure 1:
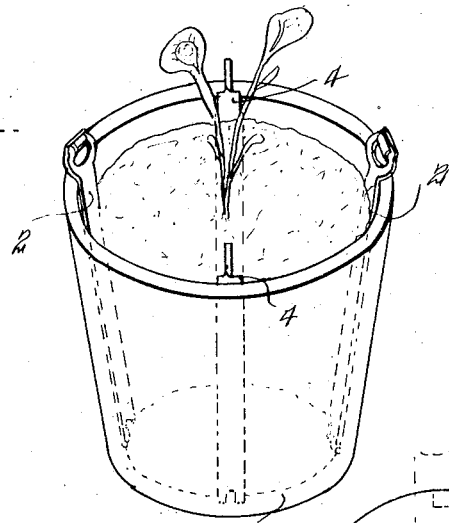
Figure 1 is a perspective view of a flower pot and growing plant provided with a transplanter embodying the invention.
Figure 4:
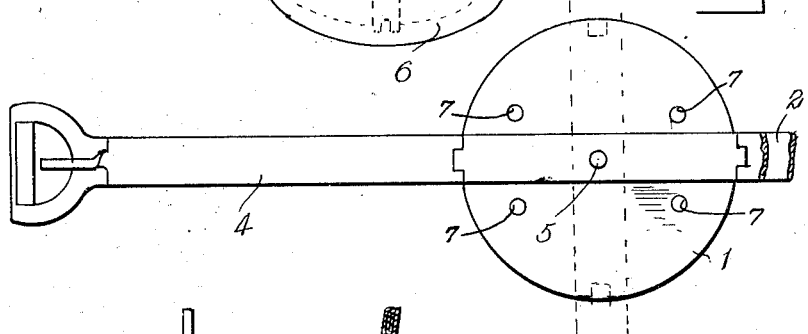
Figure 4 is a top plan view, the full lines showing the members in registering position, and the dotted lines indicating one of the members turned to occupy a position at a right angle to the companion member, the arms of both members being broken away at one end.
Figure 2:
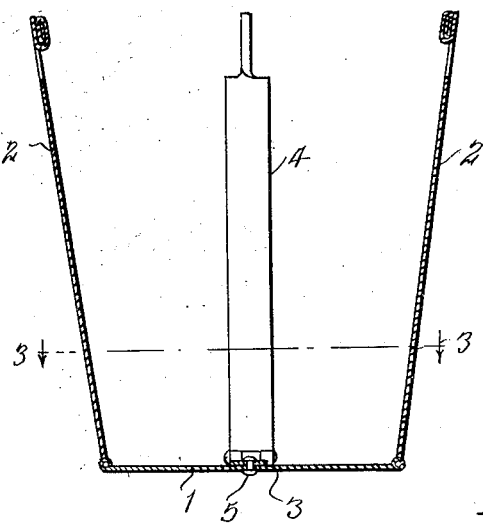
Figure 2 is an elevational view of the transplanter as it appears when adjusted for use and in vertical, central section.
Figure 3:
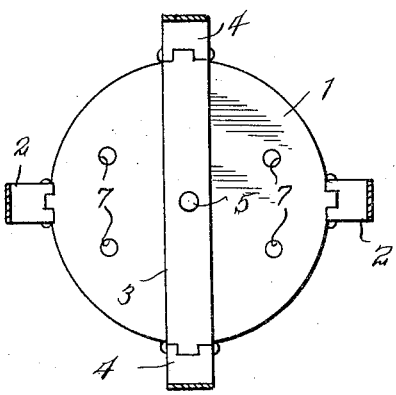
Figure 3 is a horizontal sectional view on the line 3—3 of Figure 2.

Each of the parts includes a member and arms pivoted thereto. The main part includes a member 1 and arms 2 hinged thereto at diametrically opposite points. The member 1 consists of a disk corresponding in diameter to the bottom of the pot for which the transplanter is designed. Openings 7 are formed in the member 1 for drainage. The arms 2 may be hinged to the member in any determinate way. The auxiliary part consists of a member 3 and arms 4 hinged to the ends thereof. The member 3 is narrow and consists of a strip and is pivoted centrally to the main member 1 by a suitable fastening 5. The arms 2 and 4 are of a length to project a short distance above the top of the pot 6 to be conveniently grasped when it is required to loosen the earth from the sides of the pot and remove the plant and earth therefrom.

Any suitable material, such as sheet metal, may be employed and the arms may be hingedly connected to the members in any preferred way to admit of the parts being extended and arranged in a pile for storing and shipping. It is observed that the transplanters will be marketed in different sizes to fit standard flower pots and when placed in position the members 1 and 3 rest upon the bottom of the pot and the arms 2 and 4 extend along and in contact with the inner side thereof. After the device is placed in position the pot is supplied with earth in the usual way and the plant grown therein. For transplanting the arms are turned to loosen the earth from the sides of the pot, after which the earth and plant are transferred to the new location without disturbing the roots and retarding the growth.

Having thus described the invention, I claim:

1. A transplanter comprising a circular member, arms hinged thereto at diametrically opposite points, a narrow strip pivoted intermediate its ends to the circular member at a central point for rotary movement upon the member, and arms hinged to opposite ends of the strip.

2. A transplanter comprising a circular member, provided with perforations, arms hinged to the circular member at diametrically opposite points, a strip pivoted intermediate its ends to the circular member and arms hinged to opposite ends of the strip, the arrangement admitting of the parts being extended and arranged in piles for storing and shipping.

3. A transplanter comprising a circular member, arms pivotally connected at diametrically opposite points to the periphery of the member, a strip disposed transversely of the member, means for pivotally connecting the strip to the member, said strip having arms pivotally connected to its ends and operable to rotate the strip.

4. A transplanter comprising a main member, opposed arms hinged to said member, an auxiliary member pivoted centrally to the main member to turn thereon in a plane parallel therewith, and arms hinged to the auxiliary member and adapted in one position of the two members to register with the arms hinged to the main member and lie thereagainst.

5. A transplanter comprising a member to be inserted in a flower pot and approximately cover the bottom thereof, and a narrow member pivoted centrally to the first mentioned member and provided at its ends with cutting and lifting arms.

In testimony whereof I affix my signature.

IDA EISENHART HAFLER. [L. S.]